United States Patent
Alhof et al.

(10) Patent No.: US 7,908,717 B2
(45) Date of Patent: Mar. 22, 2011

(54) FASTENER FOR COMPONENTS OF A MOTOR VEHICLE

(75) Inventors: Michael Alhof, Flörsheim (DE); Klaus-Albert Priess, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 787 days.

(21) Appl. No.: 11/748,939

(22) Filed: May 15, 2007

(65) Prior Publication Data
US 2007/0289107 A1    Dec. 20, 2007

(30) Foreign Application Priority Data
May 19, 2006 (DE) .......................... 10 2006 023 548

(51) Int. Cl.
E04F 19/02 (2006.01)
F16B 5/06 (2006.01)
(52) U.S. Cl. ............... 24/289; 24/293; 24/297; 411/502
(58) Field of Classification Search .................. 24/289, 24/573.09, 581.1, 581.11, 291, 297; 411/501, 411/502, 508, 509, 41–48; 296/1.08
See application file for complete search history.

(56) References Cited

U.S. PATENT DOCUMENTS

| | | | |
|---|---|---|---|
| 2,118,561 A | 5/1938 | Kleeberg | |
| 3,332,572 A | 7/1967 | Green | |
| 4,276,806 A | 7/1981 | Morel | |
| 4,786,225 A * | 11/1988 | Poe et al. ........................ | 24/297 |
| 5,246,322 A * | 9/1993 | Salice .............................. | 411/15 |
| 5,651,632 A | 7/1997 | Gordon | |
| 5,759,002 A * | 6/1998 | Essenberg ........................ | 24/297 |
| 6,048,147 A * | 4/2000 | Arisaka et al. .................. | 411/48 |
| 6,406,235 B1 * | 6/2002 | Bantle ............................. | 411/45 |
| 6,454,503 B1 * | 9/2002 | Polic et al. ..................... | 411/508 |
| 2004/0186632 A1 | 9/2004 | Arai | |

FOREIGN PATENT DOCUMENTS
DE          7037183 U     10/1970
(Continued)

OTHER PUBLICATIONS
Japanese Patent Office, Japanese Office Action for Japanese Application No. 2008-505783, Mar. 23, 2010.
(Continued)

Primary Examiner — Robert J Sandy
(74) Attorney, Agent, or Firm — Ingrassia Fisher & Lorenz, P.C.

(57) ABSTRACT

A fastener for components of a motor vehicle includes a tubular rivet, with a rivet head and a shank, wherein the shank has at least two longitudinal slits, between which lugs which can deflect in an elastically rebounding manner. The fastener includes a support bearing with a tubular mounting into which the shank of the rivet for the holding of at least a component between rivet head and support bearing can be inserted. Corresponding engagement elements are formed on the outer circumference of the shank and on the inner circumference of the mounting which, in a fixing position of the rivet in the mounting are engaged so that the rivet is held against slipping out of the mounting. The fastener includes a pin which can be inserted in the tubular rivet and which in a securing position in the rivet blocks a deflection of the lugs so that disengagement of the engagement elements is prevented.

21 Claims, 6 Drawing Sheets

FOREIGN PATENT DOCUMENTS

| | | |
|---|---|---|
| DE | 2242981 A1 | 3/1974 |
| DE | 2242982 A1 | 3/1974 |
| DE | 2251573 A1 | 5/1974 |
| DE | 19840014 C1 | 12/1999 |
| EP | 0735286 A1 | 10/1996 |
| JP | 1044386 A | 2/1989 |
| JP | 2001328489 A | 11/2001 |
| JP | 2004276803 A | 10/2004 |

OTHER PUBLICATIONS

German Patent Office, German Search report for German Application No. 102006023548.7, Oct. 10, 2006.

* cited by examiner

FASTENER FOR COMPONENTS OF A MOTOR VEHICLE

CROSS-REFERENCE TO RELATED APPLICATIONS

This Utility Patent Application claims priority to German Application No. DE 10 2006 023 548.7, filed May 19, 2006.

TECHNICAL FIELD

The invention relates to the technical area of the fastening technology and more preferably a fastener for components of a motor vehicle according to claim 1, a method for joining the components with such a fastener and a preferred usage of said fastener.

BACKGROUND

A wide variety of fasteners for components of a vehicle, e.g. screws, rivets, clamps, clips, hooks etc. are known from the prior art. However, these fasteners always require adequately dimensioned space which allows both their installation and also their mounting or application. In vehicle construction such space is always limited where an external shape is to satisfy defined styling requirements.

FIGS. 1A and 1B enclosed here illustrate this problem by means of a window waist belt WB which runs on the outside and alongside a vehicle door VD. For styling reasons it was demanded that the belt also engages the overlap area OA. For fastening the belt a clamp fastening was planned but which could not be employed in the overlap area OA since the space there was reduced through an outward rotation of the doorframe. The first integration vehicles therefore showed insufficient tight seating in the overlap area OA as is evident from FIG. 1B.

The object of the present invention is to provide an efficient fastener of simple design which is reliable and cost-effective and which can also be employed under narrow space conditions.

SUMMARY

This object is solved through a fastener for components of a motor vehicle which comprises a tubular rivet with a rivet head and a shank, wherein the shank has at least two slits along its length between which elastically rebounding deflectable lugs are formed and which comprises a support bearing with a tubular mounting into which the shank of the rivet for the holding of at least a component can be inserted between rivet head and support bearing, wherein engagement elements assigned to one another are formed on the outer circumference of the shank and on the inner circumference of the mounting which are engaged with one another in a fixing position of the rivet in the mounting so that the rivet is held against slipping from the mounting and comprising a pin which can be inserted in the tubular rivet and which in a securing position in the rivet blocks a deflection of the lugs so that disengagement of the engagement elements is prevented.

The desired fastening is established by simply clipping the rivet constructed in the manner of a wall plug into the mounting of the support bearing. In this way the fastener can be installed in a time-optimised manner compared with screwing. Since, besides, the clipping-in of the rivet does not require any tools the fastening can be realised more preferably also in very small spaces. A design change of the held component itself, which goes beyond a mere passage aperture or bore, is superfluous. The product costs of the fastening are reduced by approximately 40% as a result.

The fastening—although simple to establish—is also particularly reliable through the provided locking pin. This lock does not require any further space since the pin—similar to the rivet itself—can be installed manually and is accommodated in the rivet in the securing position.

Accordingly it is provided in a first advantageous embodiment of the fastener that the engaging elements comprise at least a shoulder which is formed circumferentially on the outer circumference of the rivet shank or on the inner circumference of the mounting and comprise at least a corresponding shoulder or a corresponding recess which is circumferentially formed in the same way on the respective opposite circumference wherein in the fixing position of the rivet a respective shoulder rests against an opposite shoulder or engages in an opposite recess. Such engaging elements between rivet shank and mounting can be particularly easily realised from a production point of view for example in form of a plastic injection moulded part in each case. Besides, if several shoulders/recesses are provided along the longitudinal axis of the rivet shank which can be engaged with respectively assigned shoulders/recesses of the mounting the clipping-in depth of the rivet in the mounting of the support bearing can be adapted to various component depths. This renders the fastening as a whole highly variable in application.

In general, the shoulders and recesses need not have roundings or insertion bevels provided these are dimensioned and matched to one another so that elastic deflection and rebounding of the lugs of the rivet for establishing the engagement fastening is guaranteed. A particularly simple installation of the fastener however is achieved in that at least one of the two lateral flanks of the shoulders or recesses formed on the inner circumference of the mounting terminate funnel-shaped and the shoulders or recesses formed on the outer circumference of the rivet shank, arrowhead-shaped. As a result, insertion of the rivet in the mounting free of hooking becomes possible which does not require any increased requirements in terms of fit tolerances of the individual parts and thus allows cost-effective manufacture of the fastener. For the same reasons it is also an advantage if the shank end of the rivet terminates arrowhead-shaped.

A secure fit against a component is also achieved in that the rivet head is embodied as spring plate which is shaped and dimensioned so that the fastener can be preloaded against the at least one component (VD) held between the rivet head and the support bearing. Thus, rear-end fastening of the fastener "against the stop" is also possible with components of different depths. Depending on the configuration of the spring travel of the cup, merely a single combination of complementary engaging elements can also be provided on the rivet shank and the mounting.

A rivet manufactured of a plastic material can be manufactured particularly cost-effectively, e.g. as injection moulded part as already mentioned. However, the rivet can also be manufactured of a rubber material which offers the advantage of vibration-damping mounting of the held component.

Preferred developments of rivet and pin are explained in the following.

In a preferred embodiment it is provided here that on the outer circumference of the pin and on the inner circumference of the rivet shank engaging elements assigned to one another are formed which are engaged with one another in the securing position of the pin in the rivet so that the pin is held to prevent slipping out of the rivet. This increases the reliability of the fastening, more preferably with severe and extended vibration or shock loading.

It is preferred if the engaging elements between pin and rivet shank also comprise at least a shoulder which is formed circumferentially on the inner circumference of the rivet shank and comprise at least a corresponding recess which is formed in the same way circumferentially on the circumference of the pin, wherein in the securing position of the pin in the rivet a corresponding shoulder engages in an opposite recess.

As already explained with regard to the rivet, such engaging elements can also be particularly easily realised on the pin, e.g. as rotation-symmetrical injection moulded plastic part.

As already mentioned in connection with the engagement fastening between rivet and mounting it is not necessary with suitable dimensioning and coordination of the engagement fastening between rivet and pin that said fastening has roundings or insertion bevels. However, inserting of the locking pin is also simplified if at least one of the two lateral flanks of the shoulders formed on the inner circumference of the rivet shank terminate arrowhead-shaped and of the recesses formed on the outer circumference of the pin, funnel-shaped. As a result, hooking of the pin in the rivet shank is also excluded. For the same reasons it is preferred that the insertion end of the pin also terminates arrowhead-shaped.

Alternatively or additionally to the engagement of the pin it is advantageous if the inner diameter of the rivet and the outer diameter of the pin are selected so that between the inserted pin and the rivet a press fit is created which prevents slipping-out of the pin from its securing position. Thus, a similarly reliable fastening is created even without engagement as a result of which the rivet and the pin are simpler to design and more cost effective to manufacture. A press fit between rivet and pin can more preferably also be used with a rubber rivet as a result of which a particularly reliable—and vibration-damping—mounting of the held component is created. On the other hand, the reliability of the fastening is further increased through a combination of engagement and press fit.

Both with regard to a potential disassembly as well as under stylistic aspects is it preferable if one end of the pin is designed as plate cap which, in the securing position of the pin in the rivet, rests in a positive way against the head of said rivet. On the one hand, rivet and pin head appear as a closed unit to the beholder as a result of which the fastening can also be employed in visible locations. On the other hand, the pin head offers the possibility of removing the pin again for example through prising intervention between rivet and pin head, in this way loosening the fastening between rivet and counterpart. As a result, necessary maintenance or repair operations can be easily carried out despite the extremely stable fastening.

Since the pin on delivery to the production line could be easily lost it is preferred if said pin is detachably held on the rivet in a transport position. To this end, the pin can be partially inserted in the rivet by means of which this assembly step falls away on establishing the fastening. The captive safety however can also be established in that the pin—in inserted or other position—is injection-moulded to the rivet.

Advantageous developments of the support bearing are stated in the following.

In a preferred embodiment the support bearing comprises a longitudinal basic body having fasteners for at least a further component. Thus it is possible via the fastener to provide an assembly surface which simultaneously offers all sorts of fastening possibilities and increases the efficiency of the fastening. So it is more preferably preferred if the fixing elements comprise clip and/or screw mountings which do not require any further space.

Fastening the rivet to the back of the support bearing can also be realised in that the basic body has at least a depth stop which is dimensioned so that a distance between the head of the rivet held in the fixing position and the support bearing which is adapted to the depth of the at least one component held in-between. By establishing basic bodies with different depth stops each, standardisation can be arranged in this way according to which a respectively suitable support bearing can be selected in a specific assembly situation. As a result, the fastener can be employed particularly flexibly.

Both, particularly easy assembly and also a particularly tight seat of the fastener are achieved in that the support bearing has at least one centering bevel for the central arrangement of the mounting in an assembly aperture. Hooking of the rivet in the aperture is thus avoided just as slipping of the fastener in the aperture after the assembly is excluded.

The task of the present invention is also solved through a method for fastening components on a motor vehicle with the fastener according to the invention where the shank end of the rivet is inserted through a respective assembly aperture of at least one component and engaged in the mounting of the support bearing and a pin is inserted in the rivet which blocks disengagement of the fastening. Since no tools are required, i.e. the fastening can be established manually, the assembly of the fastener is also possible in small spaces.

Here, the fastener is preferably preloaded against the at least one component by way of a rivet head embodied in the way of a spring plate which allows a secure fit, i.e. rear fastening of the rivet 'against a stop'. In that a further component is additionally joined with the basic body of the support bearing, the efficiency of the fastening can be increased.

Finally, when securing the fastening, the pin is preferably separated from the rivet prior to inserting it in said rivet. Thus, more preferably a pin not yet inserted in transport position, which is held captive for instance on the circumference of the rivet head, is no obstacle in the assembly of the rivet.

Because of the advantageously low space requirement and the particular reliability of the fastener according to the invention said fastener is preferably used for fastening a window waist belt on a door of a motor vehicle. Here, the fastener is particularly preferably arranged in an overlap area of the window waist belt at the free end of the door in order to guarantee a secure hold.

BRIEF DESCRIPTION OF THE DRAWINGS

The present invention will hereinafter be described in conjunction with the following drawing figures, wherein like numerals denote like elements, and FIG. 1A a lateral view of a door of a motor vehicle with a window waist belt which is not fastened in the overlap area OA.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1A:
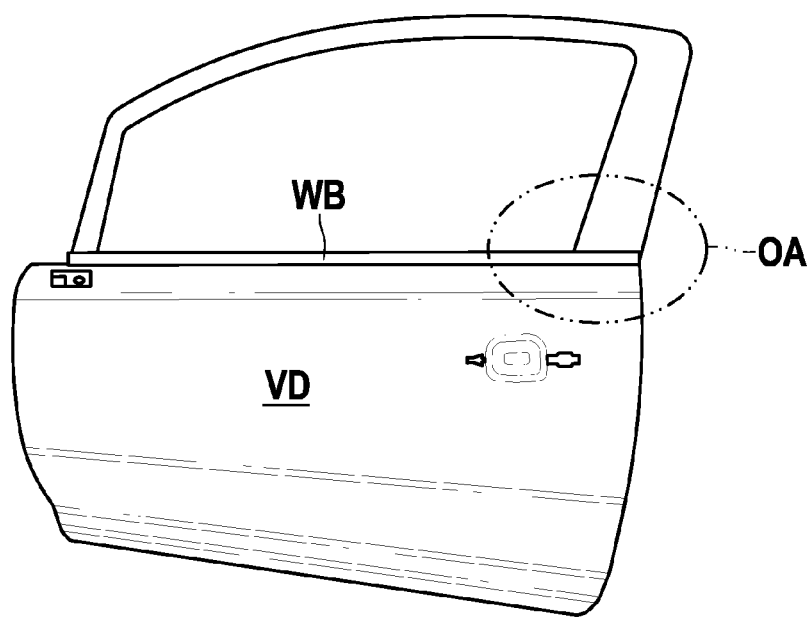
FIG. 1B the area OA of the FIG. 1A in enlarged view in which the window waist belt stands away from the door.

FIG. 1A shows a lateral view of a (driver's) vehicle door VD of a motor vehicle with a window waist belt WB which in the overlap area OA at the free end of the door VD is not yet fastened.

Figure 1B:
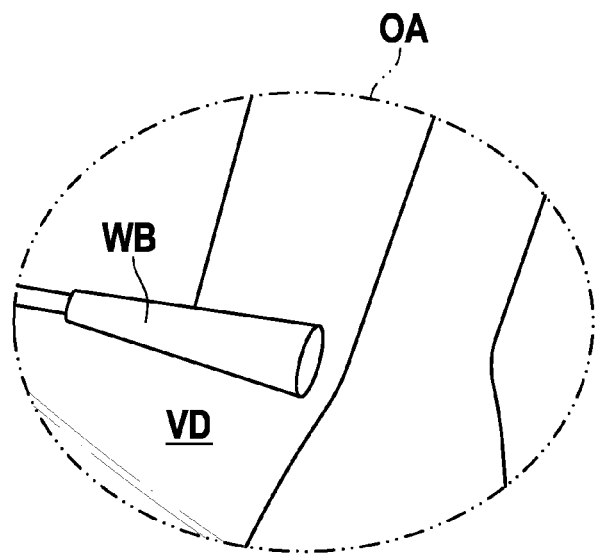

FIG. 1B shows the area OA of FIG. 1A in enlarged view. In this Figure it is visible that the stiffness of the belt WB in the usage of the vehicle is not sufficient to hold it on the outer skin of the door VD in the overlap area OA. Fastening however is not easily possible because of the confined space particularly at this point without violating preset styling requirements. This situation is further intensified through the planned outward rotation of the doorframe.

Figure 2:
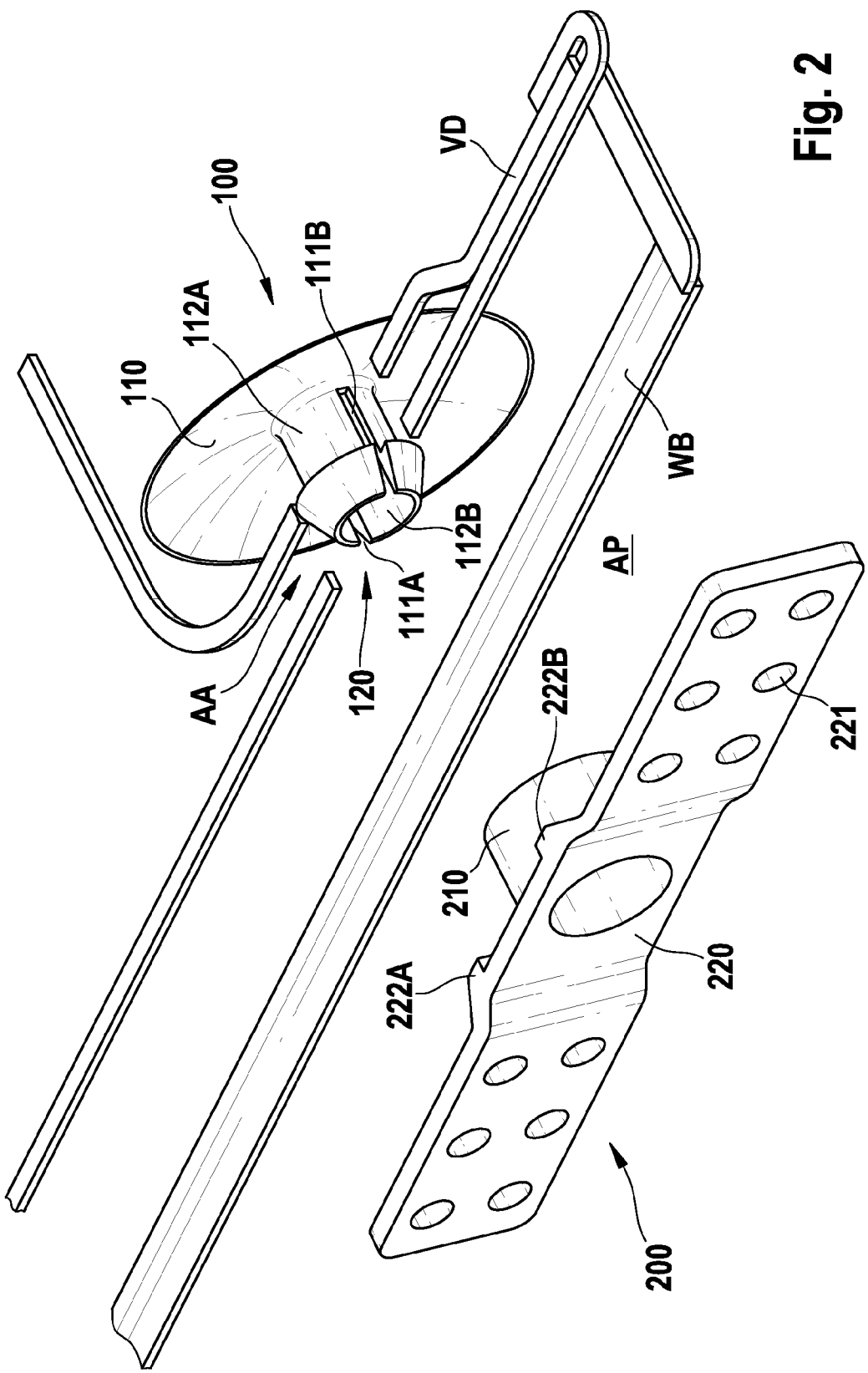
FIG. 2 a partial sectional perspective view of the fastener according to the invention in assembly position on the door of the vehicle of FIG. 1A.

FIG. 2 shows a partial sectional perspective view of the fastener according to the invention in assembly position AP on the door VD of the vehicle of FIG. 1A in which its rivet 100 and its support bearing 200 face each other. The rivet consists of a rivet head 110 formed in the way of a spring plate which rests against an inner surface of the door VD and a shank 120 which is inserted through an assembly aperture AA of the door VD. The support bearing 200 in turn has a tubular mounting 210 in which the shank 120 of the rivet 100 is inserted and engaged and a longitudinal basic body 220 with fixing elements 221 (for reasons of clarity, only one of the through holes shown here is numbered), to which a window waist belt is to be fastened. This can be done for instance via suitable screw or clip fastenings in the fixing elements 221 which, here, are embodied as simple through holes.

The rivet shank 110 is constructed in the way of a wall plug and in this embodiment has two slits 111A, 111B between which elastically deflectable lugs 112A, 112B are formed. On the front circumference of the shank 120 an engaging element terminating in the shape of an arrowhead in the insertion direction of the shank 110 is visible, by way of which the shank 110 of the rivet 120 engages in the mounting 210 of the support bearing 220. In the fixing position FP of the rivet 100 on the support bearing 200 which is explained in detail in FIG. 3, depth stops 222A, 222B formed on the basic body 220 of the support bearing 200 rest against the door VD from the outside.

The simple construction of the fastener allows rapid assembly without the use of tools in the narrow space of the door end wherein the fastener achieves a particularly tight seat against the rivet head which engages elastically in a spring-loaded manner. To achieve adaptation of the fastener to various fixing lengths, standardised support bearings 200 with different depth stops 222A, 222B and/or mountings 210 as well as standardised rivets 100, having rivet shanks 120 of different lengths or spring travels of the rivet head 110 can be provided. Several engaging elements distributed over the length of the shank 120 can also be provided which engage in corresponding engaging elements of the mounting 210 in order to bring about flexibility of the engagement in the depth direction. The basic body 220 of the support bearing 200 can also be adapted to a desired fastening scenario e.g. if no longitudinal but rather a round component is to be held.

Figure 3:
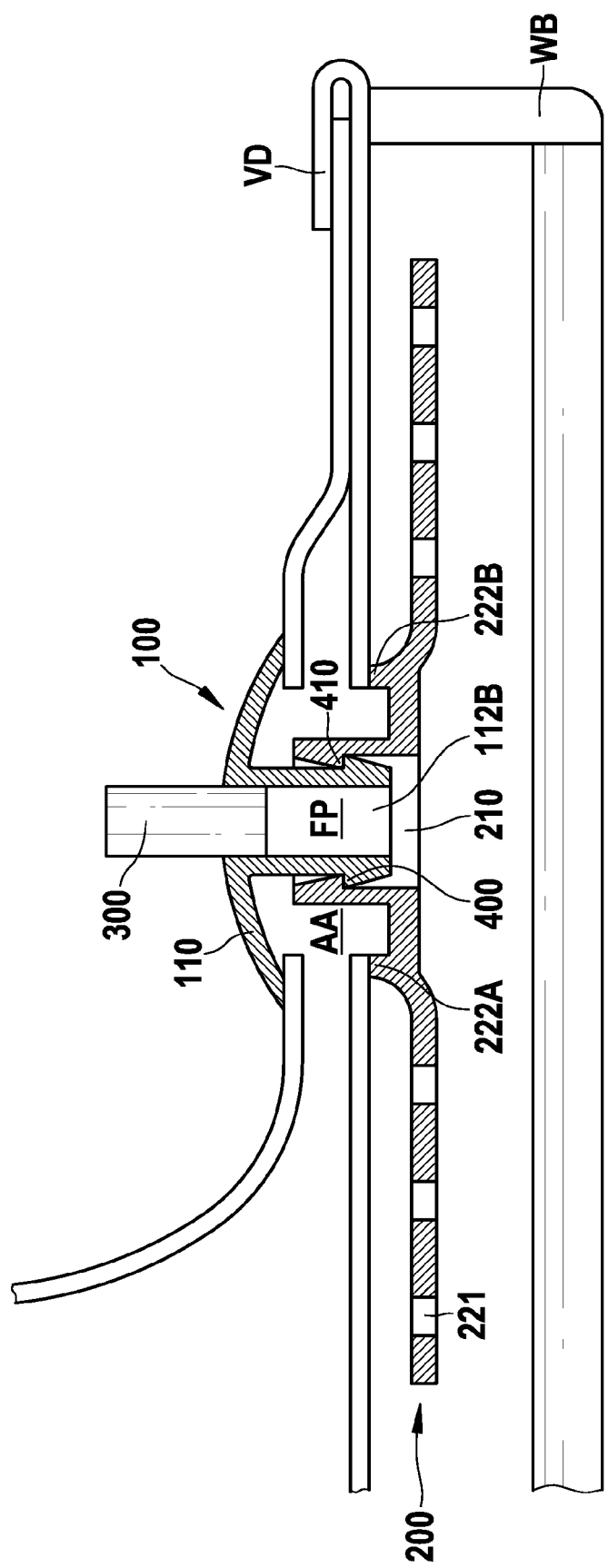
FIG. 3 a top view of a horizontal section through the fastener of FIG. 2 in fixing position with a partially inserted, engaging locking pin.

FIG. 3 shows a top view of a horizontal section through the fastener of FIG. 2 in fixing position FP with a partially inserted, engaging locking pin 300 for illustrating the engaging and securing mechanism. The engaging element already noticeable in FIG. 2 is designed as a circumferential shoulder 400 on the outer circumference of the rivet shank 120 terminating arrowhead-shaped in the insertion direction. In the fixing position FP of the rivet 100 on the support bearing 200, said rivet rests against a circumferential shoulder 410 on the inner circumference of the mounting 210 which terminates funnel-shaped in the insertion direction. On inserting the rivet shank, the lugs 112A, 112B are initially elastically moved towards each other and finally engage behind and against the shoulder 410 in an elastic rebounding manner.

In this position the fastening is under preload and has a particularly tight seat in the assembly aperture, where the spring plate type rivet head 110 rests against the inner skin of the door VD in an elastic spring-loaded way and thus pulls the depth stops 222A, 222B of the support bearing 200 against the outer skin of the door VD. Since the mounting 210 of the support bearing 200 is designed facing the rivet 100, the elements of the engagement fastening engaging in one another, namely mounting 210 and rivet shank 120, require very little space so that the fastener can also be used in confined spaces.

The fastening between rivet 100 and support bearing 200 however is also particularly secure since the pin 300—when inserted in the tubular rivet—renders disengagement of the engagement fastening, i.e. the shoulders 400 and 410, impossible. The actual pin 300 in this exemplary embodiment is provided with a press fit with the rivet so that it cannot slip out even during vibration or shock loading. In the simplest case the window waist belt can be clipped into the fixing elements 221 wherein the clip engages behind the longitudinal basic body 220 for the purpose of which said basic body is formed offset from the outer skin of the door.

Figure 4:
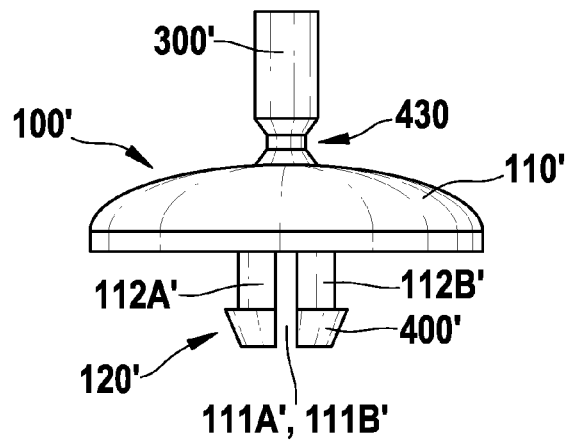
FIG. 4 a lateral view of the rivet of a further fastener according to the invention with a partially inserted, engaging locking pin.

FIG. 4 shows a lateral view of the rivet 100' of a further fastener according to the invention with a partially inserted, engaging locking pin 300'. The fundamental construction of the rivet 100' is similar to that of the first exemplary embodiment and has a disc spring type rivet head 110' and a wall plug type rivet shank 120' with slits 111A', 111B' as well as flexibly deflectable lugs 112A', 112B'. At the free end of the rivet shank 120', an engagement element in form of a shoulder 400' arranged in a circumferential way on the outer circumference, terminating in an arrowhead shape in the insertion direction, is again visible.

In contrast with the above exemplary embodiment, the pin 300' however is no longer embodied with press fit on the tubular rivet but, for its securing, has a circumferential recess 430 on its outer circumference which engages in the rivet shank 120'. The securing position SP of the pin 300' is shown in detail in FIG. 5.

Figure 5:
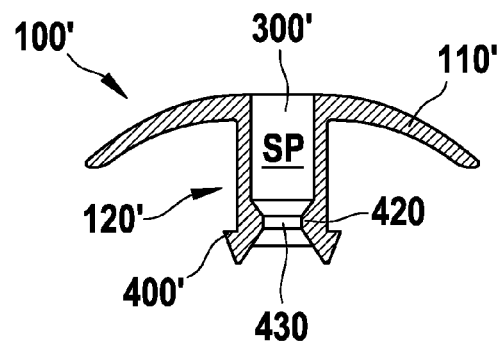
FIG. 5 a sectional lateral view of the rivet of FIG. 4 where the pin was brought in securing position and engaged.

FIG. 5 shows a sectional lateral view of the rivet 100' of FIG. 4 where the pin 300' has been brought and engaged in securing position SP. Here, a shoulder 420 formed on the inner circumference of the rivet shank 120' in a circumferential way engages in the recess 430 by means of which the pin 300' is secured against inadvertent slipping out and the shoulder 400' is simultaneously secured against disengagement from the engagement. An advantage of the engaging pin 300' compared with the press fit pin 300 consists in that a defined securing position SP of the pin 300' is achieved during the assembly of the fastening. Thus, pins which have been inserted too little or too deeply are excluded and an edge-free rivet head surface is additionally ensured which is of interest for stylistic reasons.

Figure 6:
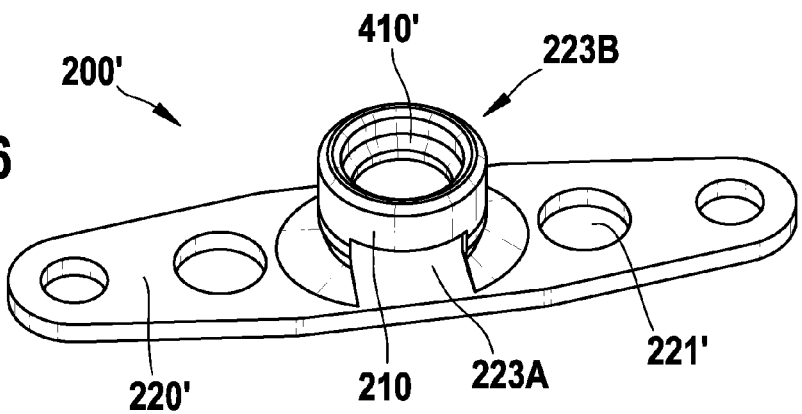
FIG. 6 a perspective view of a support bearing for the rivet of FIGS. 4 and 5.

Disassembly of both fastenings so far presented can be effected by drilling open the locking pin s 300, 300' as a result of which the rivets 100, 100' could be prised from their respective mountings 210, 210' (mounting 210' shown in FIG. 6). The pins 300, 300' however can also be provided with heads which positively rest against the respective rivet head 110, 110' and via which the pin could be extracted with a tool.

FIG. 6 shows a perspective view of a support bearing 200' for the rivet 100' of FIGS. 4 and 5. Similar to the support bearing 200 of the first exemplary embodiment, this consists of a longitudinal basic body 220' and a tubular mounting 210' for the rivet shank 120'. Circumferentially on the inner circumference of the mounting 210', an engagement element is visible which consists of a shoulder 410' terminating funnel-shaped, behind which and against which the shoulder 400' rests against the elastically rebounding lugs 112A', 112B' of the rivet shank 120'. To facilitate inserting the mounting in an assembly aperture on a component and guarantee a central seat, centering bevels 223A, 223B (not visible) are provided on the basic body 220' of the support bearing 200'. The basic body 220' additionally has fixing elements 221' which are designed as through-holes of different size diameters. As a result, different strength clip-on fastenings respectively matched to a desired component can be established with one and the same support bearing.

Figure 7A:
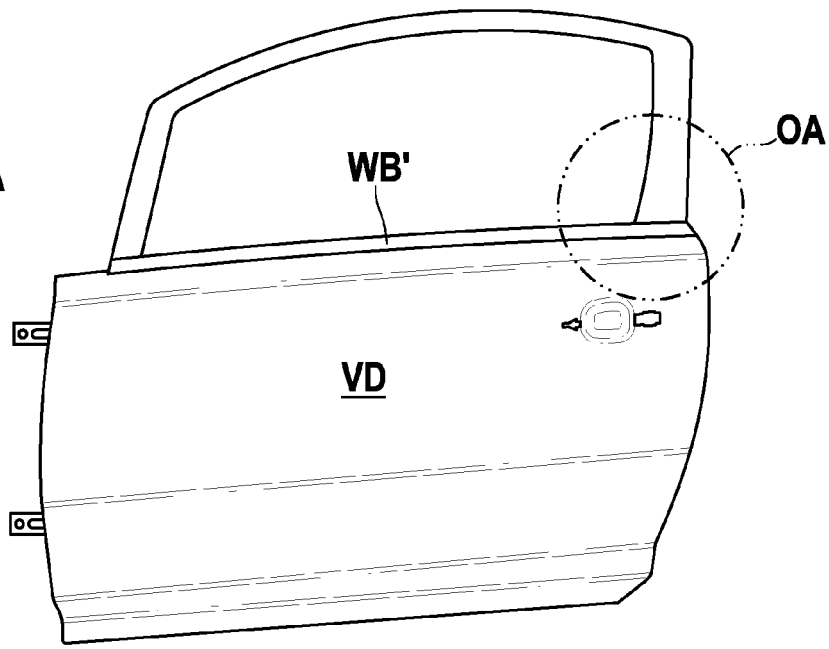
FIG. 7A a further lateral view of the door of FIGS. 1A and 1B with a window waist belt which in the overlap area OA is fastened with a fastener according to the invention.

FIG. 7A shows a further lateral view of the door of FIGS. 1A and 1B with a window waist belt WB', which in the overlap area OA is fastened with a fastener according to the invention.

Figure 7B:
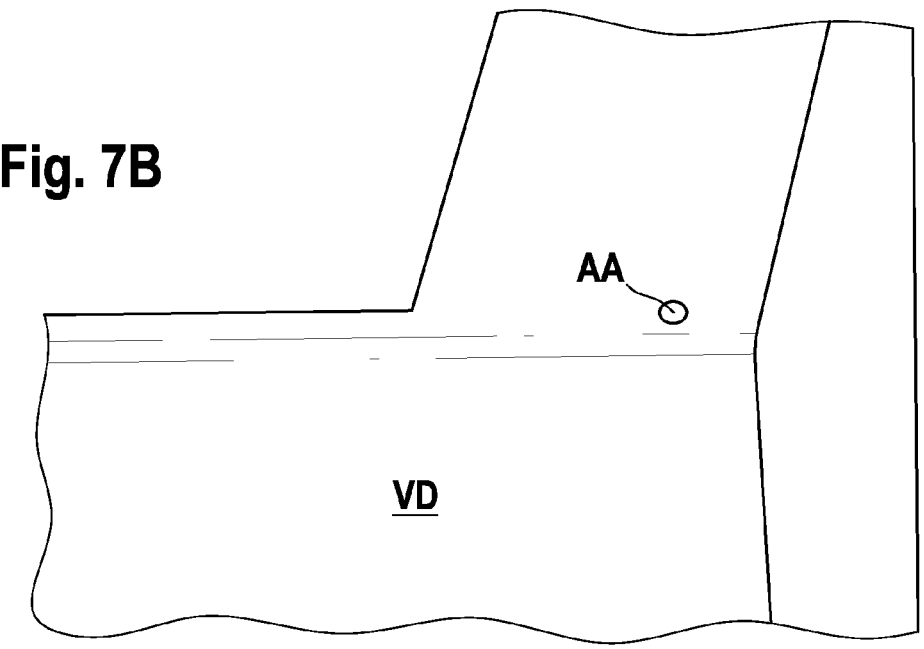
FIG. 7B the area OA of the FIG. 7A in enlarged view with the removed window waist belt, wherein an assembly aperture for the fastener according to the invention is visible, and FIG. 8 a perspective view of the rivet and pin head of a fastener according to the invention which is fastened to the door of FIGS. 1A, 1B, 7A and 7B.

FIG. 7B shows the area OA of FIG. 7A in enlarged view with the removed waist belt WB', wherein an assembly aperture AA for the fastener according to the invention is visible. In this assembly aperture the rivet 100, 100' and the support bearing 200, 200' respectively are inserted according to one of the embodiments and engaged with one another in order to finally clip the door end area of the waist belt WB' into its respective basic body 220, 220'. Detachment of the waist belt WB' through using the vehicle or the door is no longer possible because of this attachment. A corresponding drill hole can be easily provided subsequently on the door but can also have been provided even in the unfinished part. Assembly requires no additional tool and can be carried out easily and quickly and therefore cost-effectively.

Figure 8:
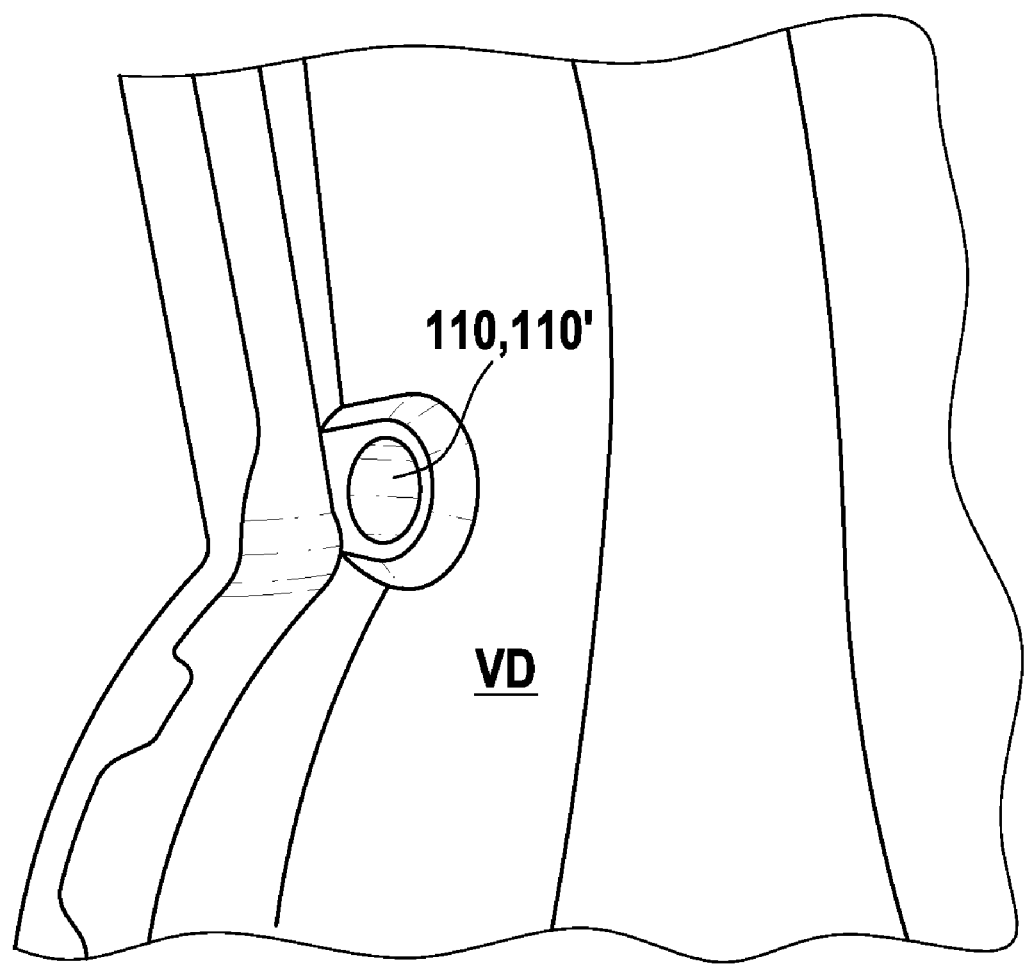

FIG. 8 shows a perspective view of the rivet and pin head of a fastener according to the invention which is fastened to the door of FIGS. 1A, 1B, 7A and 7B. Through the edge-free mounting of the locking pin in the rivet 110, 110', a stylistically acceptable integration of the fastener in the door VD is possible although the space is extremely restricted.

It remains to point out that the fastener according to the invention is not restricted to only the application of a window waist belt described here. The fastener can be generally employed with the described advantages where between rivet head 110, 110' and basic body 220, 220' for instance two components are to be held against one another and additional components are to be connected to the basic body 220, 220'. Here, the fastener need not absolutely consist of a plastic material but can also be made of metal providing adequate stability. In highly vibration-loaded areas of the vehicle, at least the rivet 100, 100' can consist of a rubber material in order to achieve appropriate damping against the components.

In any case the fastener according to the invention allows simple, rapid assembly in very restricted space conditions. It has a tight seat and extremely reliable hold and moreover is of a simple design and can be manufactured cost-effectively.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A fastener for components of a motor vehicle, comprising:
    a tubular rivet, with a rivet head and a shank, wherein the shank has at least two longitudinal slits, between which lugs deflectable in an elastically rebounding way are formed;
    a support bearing with a tubular mounting, in which the shank of the rivet for holding of at least one component can be inserted between the rivet head and support bearing, wherein engagement elements are formed on the outer circumference of the shank and on the inner circumference of the mounting which in a fixing position of the rivet in the mounting are engaged with one another so that the rivet is held against slipping out of the mounting; and
    a pin, having an insertion end which can be inserted in the tubular rivet and which in a securing position blocks a deflection of the lugs in the rivet so that disengagement of the engagement elements is prevented; and
    wherein the rivet head is a spring plate configured such that that the fastener can be preloaded against the at least one component held between the rivet head and the support bearing.

2. The fastener according to claim 1, wherein the engagement elements comprise at least a shoulder which is formed in a circumferential way on the outer circumference of the rivet shank or on the inner circumference of the mounting and comprise at least a corresponding shoulder or a corresponding recess which is formed in a circumferential manner on the respective opposite circumference, wherein in the fixing position of the rivet a respective shoulder rests against an opposite shoulder or engages in a opposite recess.

3. The fastener according to claim 2, wherein at least one of the two shoulders or recesses formed on the inner circumference of the mounting includes a lateral flank that terminates funnel-shaped, and the shoulders or recesses formed on the outer circumference of the rivet shank or recesses includes a lateral flank that terminates arrowhead-shaped.

4. The fastener according to claim 1, wherein the shank of the rivet terminates arrowhead-shaped.

5. The fastener according to claim 1, wherein the rivet is made of a plastic or a rubber material.

6. The fastener according to claim 1, wherein engagement elements are formed on the outer circumference of the pin and on the inner circumference of the rivet shank which in the securing position of the pin in the rivet are engaged with one another so that the pin is held against slipping out of the rivet.

7. The fastener according to claim 6, wherein the engagement elements comprise at least a shoulder which is formed in a circumferential manner on the inner circumference of the rivet shank and comprising at least a corresponding recess which is formed in a likewise circumferential manner on the circumference of the pin, wherein a corresponding shoulder engages in an opposite recess in the securing position of the pin in the rivet.

8. The fastener according to claim 7, wherein at least one of the shoulders formed on the inner circumference of the rivet shank includes a lateral flank that terminates arrowhead-shaped and the recesses formed on the outer circumference of the pin terminates funnel-shaped.

9. The fastener according to claim 1, wherein the insertion end of the pin terminates arrowhead-shaped.

10. The fastener according to claim 1, wherein the inner diameter of the rivet and the outer diameter of the pin are selected so that a press fit is created between the inserted pin and the rivet, which prevents slipping out of the pin from a securing position.

11. The fastener according to claim 1, wherein an end of the pin is a plate cap, which, in the securing position of the pin, positively rests in the rivet against the head of said rivet.

12. The fastener according to claim 1, wherein the pin in a transport position is detachably held on the rivet.

13. The fastener according to claim 12, wherein the pin is partially inserted in the rivet.

14. The fastener according to claim 12, wherein the pin is injection-moulded to the rivet.

15. The fastener according to claim 1, wherein the support bearing comprises a longitudinal basic body which has fixing elements for at least a further component.

16. The fastener according to claim 15, wherein the fixing elements comprise clip and/or screw mountings.

17. The fastener according to claim 15, wherein the basic body has at least a depth stop which is dimensioned so that a distance between the head of the rivet held in the fixing position and the support bearing is adapted to the depth of the at least one component held in-between.

18. The fastener according to claim 1, wherein the support bearing has at least a centring bevel for central arrangement of the mounting in an assembly aperture.

19. A method for the fastening of components to a motor vehicle with a fastener according to any one of the preceding claims, wherein the shank of the rivet is inserted through a respective assembly aperture of at least one component in the mounting of the support bearing and engaged and a pin is inserted in the rivet which blocks disengagement of the fastening, wherein the fastener is preloaded against the at least one component by way of a rivet head embodied in a manner of a spring plate.

20. The method according to claim 19, wherein a further component is joined with the basic body of the support bearing.

21. The method according to claim 19, wherein the pin is separated from the rivet prior to insertion in said rivet.

* * * * *